US011525488B2

(12) United States Patent
Iwasaki et al.

(10) Patent No.: US 11,525,488 B2
(45) Date of Patent: Dec. 13, 2022

(54) AUTOMATIC TRANSMISSION (71) Applicant: Mazda Motor Corporation, Hiroshima (JP)

(72) Inventors: Tatsuhiko Iwasaki, Aki-gun (JP); Keiichi Nakamura, Aki-gun (JP); Yoshihiko Fujita, Aki-gun (JP); Tetsuo Yamada, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/453,703

(22) Filed: Nov. 5, 2021

(65) Prior Publication Data

US 2022/0154782 A1 May 19, 2022

(30) Foreign Application Priority Data

Nov. 19, 2020 (JP) ............................. JP2020-192615

(51) Int. Cl.
*F16D 13/70* (2006.01)
*F16D 25/0638* (2006.01)
(Continued)

(52) U.S. Cl.
CPC ......... *F16D 25/0638* (2013.01); *F16D 13/62* (2013.01); *F16D 13/70* (2013.01); *F16D 2121/04* (2013.01); *F16D 2250/00* (2013.01)

(58) Field of Classification Search
CPC ........... F16D 23/14; F16D 13/52; F16D 13/70
See application file for complete search history.

(56) References Cited

U.S. PATENT DOCUMENTS 4,741,422 A * 5/1988 Fuehrer .................. F16D 25/12
192/85.25
7,121,392 B2 * 10/2006 Braford .................. F16D 25/10
192/48.91
(Continued)

FOREIGN PATENT DOCUMENTS

DE  102017206218 A1 * 10/2018 ........... F16D 13/683
EP       1726842 A1 * 11/2006 ............. F16D 21/06
JP     2013047571 A      3/2013

OTHER PUBLICATIONS

NPL document "What is Additive Manufacturing" retrieved from https://www.energy.gov/eere/articles/what-additive-manufacturing (Year: 2017).*

*Primary Examiner* — Stacey A Fluhart
(74) *Attorney, Agent, or Firm* — Alleman Hall Creasman & Tuttle LLP (57) ABSTRACT

An automatic transmission includes a clutch device having a clutch hub, a clutch drum, a friction plate, a piston, and a hydraulic chamber. The clutch drum includes an outer-side cylindrical portion, a disc-shaped first radial portion extending radially inwardly, an axial portion extending axially from the first radial portion, and a disc-shaped second radial portion extending radially inwardly from the axial portion. The piston includes a pressing portion disposed between the first radial portion and the friction plate side, and a disc-shaped piston radial portion extending radially inwardly from the pressing portion. The hydraulic chamber is provided radially inwardly from the axial portion and on the non-friction-plate side of the piston radial portion. A comb-teeth portion is provided at a radially intermediate portion of the piston radial portion. The axial portion and the piston radial portion intersect with each other in a comb-teeth shape.

20 Claims, 5 Drawing Sheets

(51) Int. Cl.
  *F16D 13/62*   (2006.01)
  *F16D 121/04*  (2012.01)

(56) References Cited

U.S. PATENT DOCUMENTS

| | | | |
|---|---|---|---|
| 2009/0203453 A1* | 8/2009 | Heinrich | F16D 21/06 |
| | | | 464/75 |
| 2015/0083546 A1* | 3/2015 | Moser | F16D 13/52 |
| | | | 192/41 R |
| 2017/0268580 A1* | 9/2017 | Dole | F16D 25/10 |
| 2021/0094404 A1* | 4/2021 | Park | F16D 25/0638 |

\* cited by examiner

FIG. 1

NON-DRIVE SOURCE SIDE
(ONE AXIAL-DIRECTION SIDE)

DRIVE SOURCE SIDE
(OTHER AXIAL-DIRECTION SIDE)

AUTOMATIC TRANSMISSION

TECHNICAL FIELD

The present disclosure relates to an automatic transmission.

BACKGROUND ART

In an automatic transmission mounted on a vehicle such as an automobile, typically, a motive power transmitting path of a transmission mechanism using a plurality of planetary gear mechanisms is switched by selectively fastening a plurality of friction fastening elements such as a clutch and a brake to form a shift stage according to an operational state of the vehicle.

There is a tendency for the number of shift stages of the automatic transmission to increase for the purpose of improvement of fuel consumption performance of the vehicle and the like. When the number of planetary gear mechanisms or friction fastening elements increases in association with the increase in the number of stages of the automatic transmission, the axial-direction dimensions and radial-direction dimensions of the whole transmission increase, causing a problem for the in-vehicle mountability.

As a clutch device of an automatic transmission, JP2013-047571A discloses a clutch device including a clutch drum having an outer-side cylindrical portion and a radial-direction portion extending from an end portion of the outer-side cylindrical portion on one axial-direction side to the radial-direction inner side, a clutch hub having an inner-side cylindrical portion facing the outer-side cylindrical portion, a friction plate which engages with the outer-side cylindrical portion and the inner-side cylindrical portion, a piston which presses the friction plate, and a hydraulic chamber to which operating oil which urges the piston in the direction of the friction plate is supplied.

SUMMARY OF INVENTION

Problem to be Solved by the Invention

In the clutch device of JP2013-047571A, a plurality of the friction plates, the piston, and the hydraulic chamber are disposed side by side in the axial direction on the inner side of the clutch drum (within a region overlapping with the outer-side cylindrical portion in the axial direction) and at the radial-direction portion of the clutch drum; accordingly, there is room for improvement in shortening in the axial direction.

In contrast, it is considered that the hydraulic chamber is provided on the outer side of the clutch drum and on the radial-direction inner side from the friction plates to thereby shorten the axial-direction dimensions of the whole clutch device. In this case, in order to press the friction plates disposed on the inner side of the clutch drum, it is considered that, for example, the clutch drum is provided with a through hole, the piston is formed in a comb-teeth shape, and the piston is caused to penetrate through the clutch drum.

However, in the case where the piston is formed in a comb-teeth shape, rigidity of the piston might deteriorate as compared with a ring-shaped piston continuous in the circumferential direction.

An object of the present disclosure is to, in an automatic transmission including a clutch device, suppress deterioration of rigidity of a clutch drum and a piston while shortening axial-direction dimensions of the clutch device.

Means for Solving the Problem

To solve this problem, the present disclosure is characterized by the following configurations.

The present disclosure provides an automatic transmission including a clutch device, wherein the clutch device includes a clutch hub including an inner-side cylindrical portion located on a radial-direction inner side, a clutch drum including an outer-side cylindrical portion disposed on the radial-direction outer side of the inner-side cylindrical portion, a friction plate provided slidably between the inner-side cylindrical portion and the outer-side cylindrical portion, a piston which presses the friction plate from a first axial-direction side, and a hydraulic chamber to which operating oil which urges the piston in a direction of the friction plate is supplied, the clutch drum includes a disc-shaped first radial-direction portion extending from an end portion of the outer-side cylindrical portion on the first axial-direction side toward the radial-direction inner side, a comb-teeth shaped axial-direction portion extending from an end portion of the first radial-direction portion on the radial-direction inner side toward a second axial-direction side, and a disc-shaped second radial-direction portion extending from an end portion of the axial-direction portion on the second axial-direction side toward the radial-direction inner side, the piston includes a pressing portion disposed between the first radial-direction portion and the friction plate to press the friction plate, and a disc-shaped piston radial-direction portion extending toward the radial-direction inner side from the pressing portion, the hydraulic chamber is provided on the radial-direction inner side from the axial-direction portion of the clutch drum and on a non-friction-plate side of the piston radial-direction portion, and a comb-teeth portion is provided at a radial-direction intermediate portion of the piston radial-direction portion, and the axial-direction portion and the piston radial-direction portion intersect with each other in a comb-teeth shape.

According to the present disclosure, regarding the clutch drum and the piston, the axial-direction portion and the radial-direction intermediate portion of the piston radial-direction portion intersect with each other in the comb-teeth shape, so that the hydraulic chamber can be provided on the outer side of a space in which the friction plate surrounded by the outer-side cylindrical portion, the first radial-direction portion, and the axial-direction portion is housed and on the radial-direction inner side from the axial-direction portion. As a result, the axial-direction dimensions of the clutch drum can be shortened as compared with a case where the hydraulic chamber is provided on the inner side of the space in which the friction plate is housed, consequently shortening the axial-direction dimensions of the automatic transmission.

In the clutch drum and the piston, a part except for the axial-direction portion and the radial-direction intermediate portion of the piston radial-direction portion which intersect with each other in the comb-teeth shape is formed in a disc shape continuous in the circumferential direction, so that, even in the case where the clutch drum and the piston intersect with each other in the comb-teeth shape, deterioration of the rigidity of the clutch drum and the piston can be suppressed while the axial-direction dimensions of the clutch device are shortened.

The clutch drum may further include an outer-peripheral side clutch drum including the outer-side cylindrical portion, the first radial-direction portion, and the axial-direction portion, and an inner-peripheral side clutch drum including the second radial-direction portion and attached to an inner end portion of the outer-peripheral side clutch drum in a radial direction.

According to this configuration, the clutch drum is formed by two components, so that, while the axial-direction portion of the clutch drum and the piston radial-direction portion intersect with each other, a comb-teeth shaped tip part of the axial-direction portion can be closed in a ring shape.

The clutch drum and the piston may be an additively manufactured article formed by an additive manufacturing method.

According to this configuration, the clutch drum and the piston can be formed as one component as compared with, for example, a clutch drum formed by welding two components for achieving a comb-teeth structure, so that the number of assembling steps is reduced.

The piston may further include a pressure receiving portion which receives pressure of the operating oil supplied to the hydraulic chamber, and a bearing portion disposed between a part on the radial-direction inner side from the radial-direction intermediate portion of the piston radial-direction portion and the pressure receiving portion.

According to this configuration, a part connected to the bearing portion of the piston is formed in a ring shape, so that the rigidity of the piston can be enhanced as compared with a case where, for example, a comb-teeth shaped part of the piston is connected to the bearing portion.

The bearing portion may be disposed on the radial-direction inner side from the pressing portion of the piston so as to overlap with the pressing portion in an axial direction.

According to this configuration, the axial-direction dimensions can be shortened as compared with a case where the bearing portion and the pressing portion are disposed side by side in the axial direction.

The bearing portion may be disposed on the radial-direction inner side of the axial-direction portion so as to overlap with the axial-direction portion in an axial direction.

According to this configuration, the axial-direction dimensions can be shortened as compared with a case where the bearing portion and the axial-direction portion are disposed side by side in the axial direction.

The axial-direction portion may be a first axial-direction portion. The clutch drum may include a second axial-direction portion extending from an end portion of the second radial-direction portion on the radial-direction inner side toward the first axial-direction side and overlapping with the axial-direction portion in an axial direction. The bearing portion may be disposed between the axial-direction portion and the second axial-direction portion so as to overlap with the axial-direction portion and the second axial-direction portion in the axial direction.

According to this configuration, the axial-direction dimensions can be shortened as compared with a case where the second axial-direction portion and the bearing portion are disposed side by side in the axial direction.

Advantageous Effect of Invention

According to the present disclosure, in the automatic transmission including the clutch device, it is possible to suppress deterioration of the rigidity of the clutch drum and the piston while shortening the axial-direction dimensions of the clutch device.

MODE FOR CARRYING OUT THE INVENTION

Hereinafter, an embodiment of the present disclosure will be described.

Figure 1:
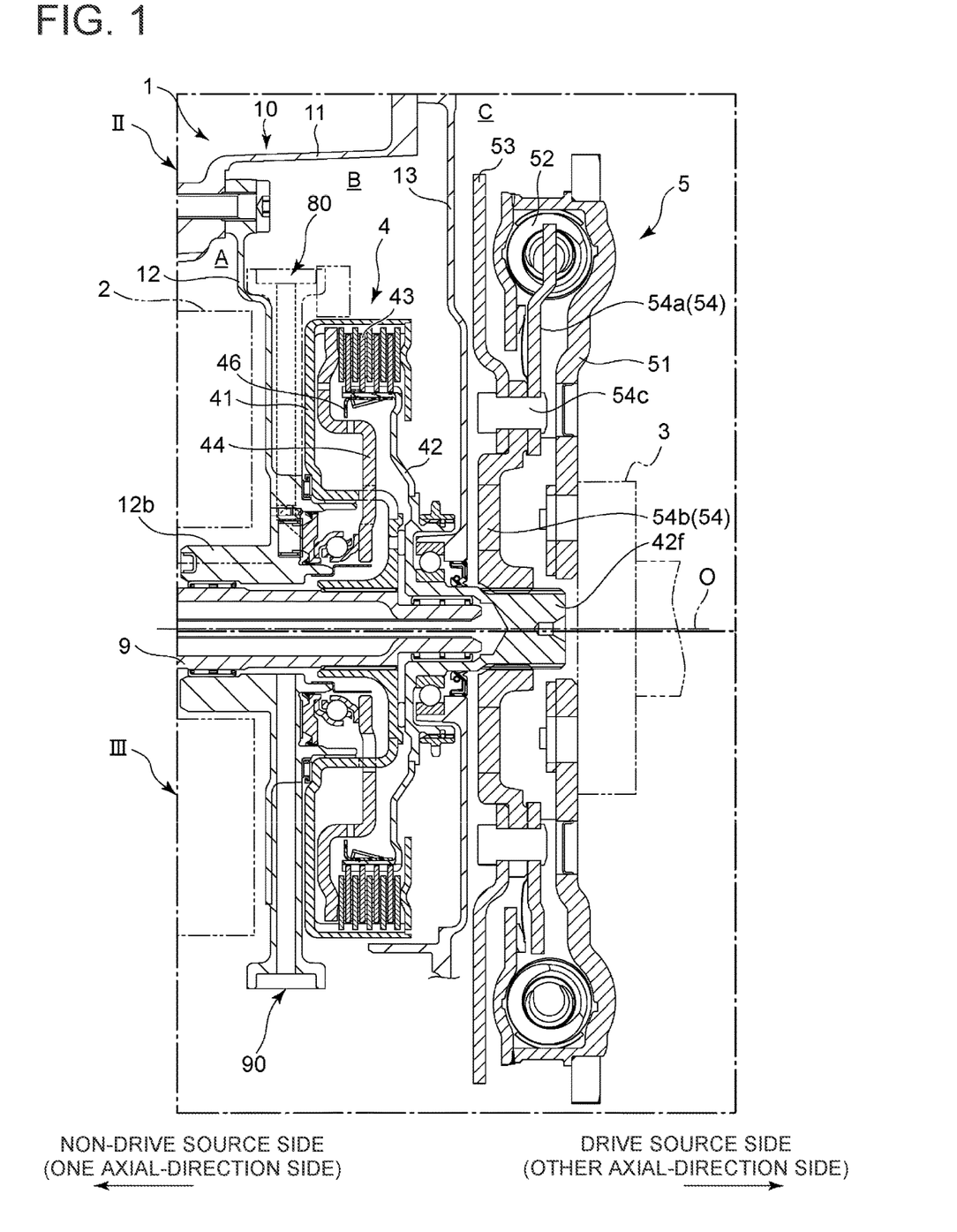
FIG. 1 is a cross-sectional view illustrating a starting clutch of an automatic transmission according to an embodiment of the present disclosure.

FIG. 1 illustrates a configuration of an automatic transmission 1 on a drive source side in the embodiment of the present disclosure, and its surroundings. The automatic transmission 1 according to the embodiment of the present disclosure is coupled to an engine (not illustrated) as a drive source without via a fluid transfer device such as a torque converter. The engine is an in-line four-cylinder engine in which four cylinders are disposed in line, which is not limited to this, and torque fluctuation occurs twice while a crankshaft which is an output shaft 3 of the engine rotates once.

The automatic transmission 1 includes a transmission mechanism 2 having a plurality of planetary gear sets and a plurality of friction fastening elements such as a clutch and a brake, and a starting clutch 4 serving as a clutch device disposed between the transmission mechanism 2 and the engine. It should be noted that in the present embodiment, a non-drive source side may be referred to as a first axial-direction side and the drive source side may be referred to as a second axial-direction side.

The transmission mechanism 2 is configured to achieve a predetermined shift stage according to an operational state of a vehicle by selectively fastening the plurality of friction fastening elements and switching a motive power transmitting path passing through each planetary gear set. In the vehicle equipped with the automatic transmission 1, motive power from the transmission mechanism 2 is transmitted to a drive wheel.

In the automatic transmission 1, the transmission mechanism 2 and the starting clutch 4 are housed in a transmission case 10, and the transmission mechanism 2, the starting clutch 4, and the output shaft (crankshaft) 3 of the engine are disposed side by side on the same axis line O. In the present embodiment, a flywheel damper 5 for suppressing transmission of torque fluctuation of the engine to the automatic transmission 1 side is disposed between the engine and the starting clutch 4.

The transmission case 10 houses therein the transmission mechanism 2 and the starting clutch 4, and includes a cylindrical case body 11 having an opening on the engine side, and a partition wall 12 partitioning the inside of the case body 11 in the axial direction. The partition wall 12 divides a space in the case body 11 into a space (transmission mechanism chamber) A on the transmission mechanism 2 side and a space (starting clutch chamber) B on the starting clutch 4 side. The opening of the case body 11 on the engine side is closed by a damper housing 13 which houses therein the flywheel damper 5 and which is coupled to a cylinder block of an engine 3 and the like. The damper housing 13 is configured to close a space (damper chamber) C on the engine side with respect to the space (starting clutch chamber) B on the starting clutch 4 side.

An input shaft 9 of the transmission mechanism 2 is provided such that the input shaft 9 penetrates through the partition wall 12 and a tip of the input shaft 9 protrudes into the clutch chamber B. An engine-side input shaft 42f which is connected to the flywheel damper 5, which will be described later, is rotatably connected to the outer peripheral side of an end portion of the input shaft 9 of the transmission mechanism 2 on the drive source side. The engine-side input shaft 42f is provided such that the engine-side input shaft 42f penetrates through the damper housing 13 and a tip of the engine-side input shaft 42f protrudes into the damper chamber C.

The flywheel damper 5 has a disc-shaped input plate 51, an elastic member 52 such as a coil spring, a flywheel 53 for reducing torque fluctuation of the engine, and a disc-shaped output plate 54.

The output shaft 3 of the engine is fixed to the input plate 51, and the input plate 51 is configured to rotate on the same axis O in association with rotation of the output shaft 3. The input plate 51 is provided with, in the circumferential direction, a plurality of holding portions (not illustrated) which hold the elastic member 52.

The output plate 54 has a first output plate 54a having an outer peripheral portion which is engaged with the elastic member 52, and a second output plate 54b disposed on the non-drive source side of the first output plate 54a and having an end portion on the radial-direction inner side which is spline-fitted to the engine-side input shaft 42f. Regarding the first output plate 54a and the second output plate 54b, an end portion of the first output plate 54a on the radial-direction inner side and an end portion of the second output plate 54b on the radial-direction outer side are coupled together by a coupling member 54c such as a rivet pin. With this, rotation of the output shaft 3 of the engine is transmitted to the engine-side input shaft 42f of the automatic transmission 1 via the elastic member 52. It should be noted that the disc-shaped flywheel 53 is disposed on the non-drive source side of the second output plate 54b, and an inner end portion of the flywheel 53 is fixed to the first output plate 54a and the second output plate 54b by the coupling member 54c.

Figure 3:
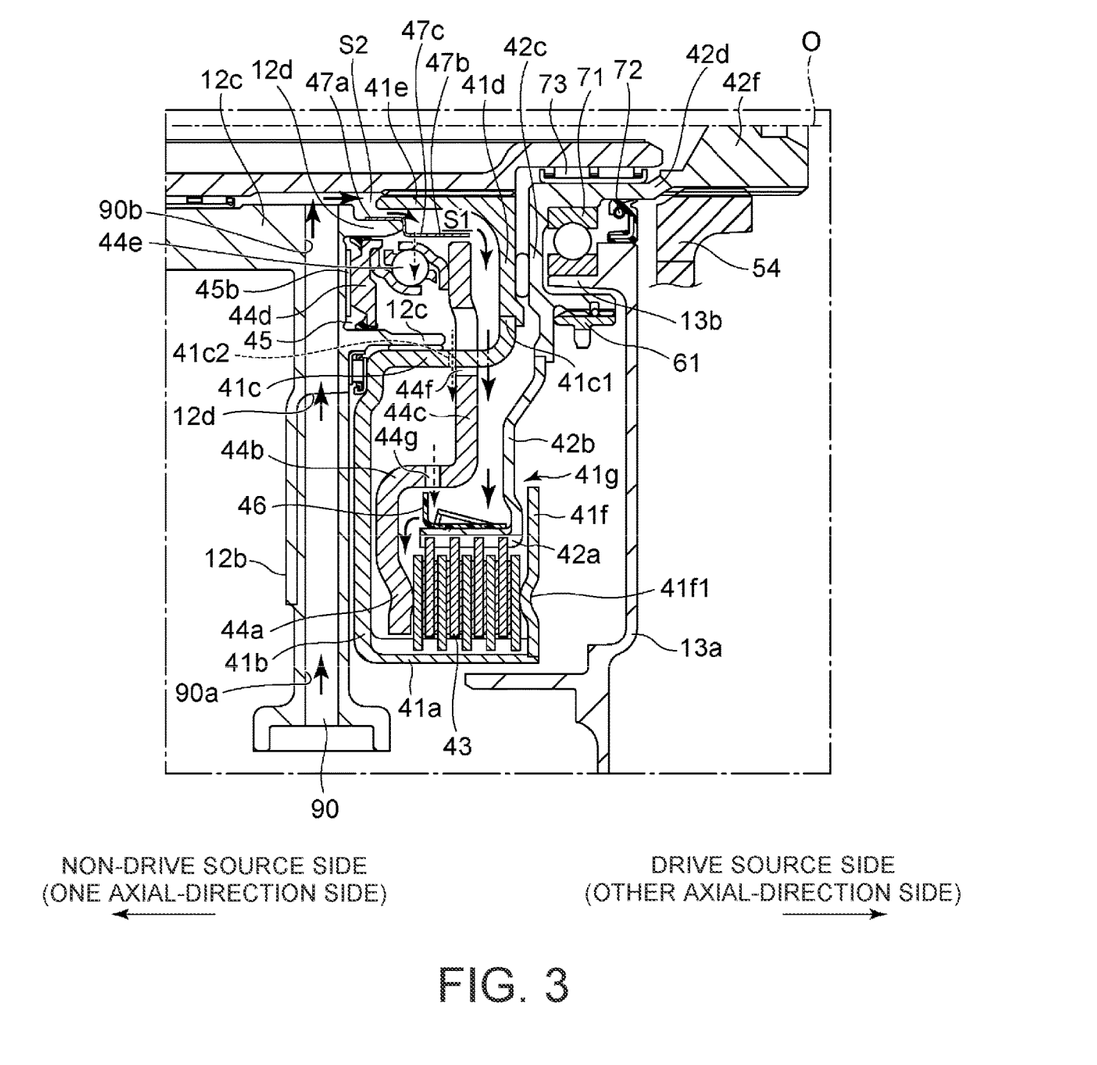
FIG. 3 is an enlarged cross-sectional view of the starting clutch of arrow III in FIG. 1.
Figure 4:
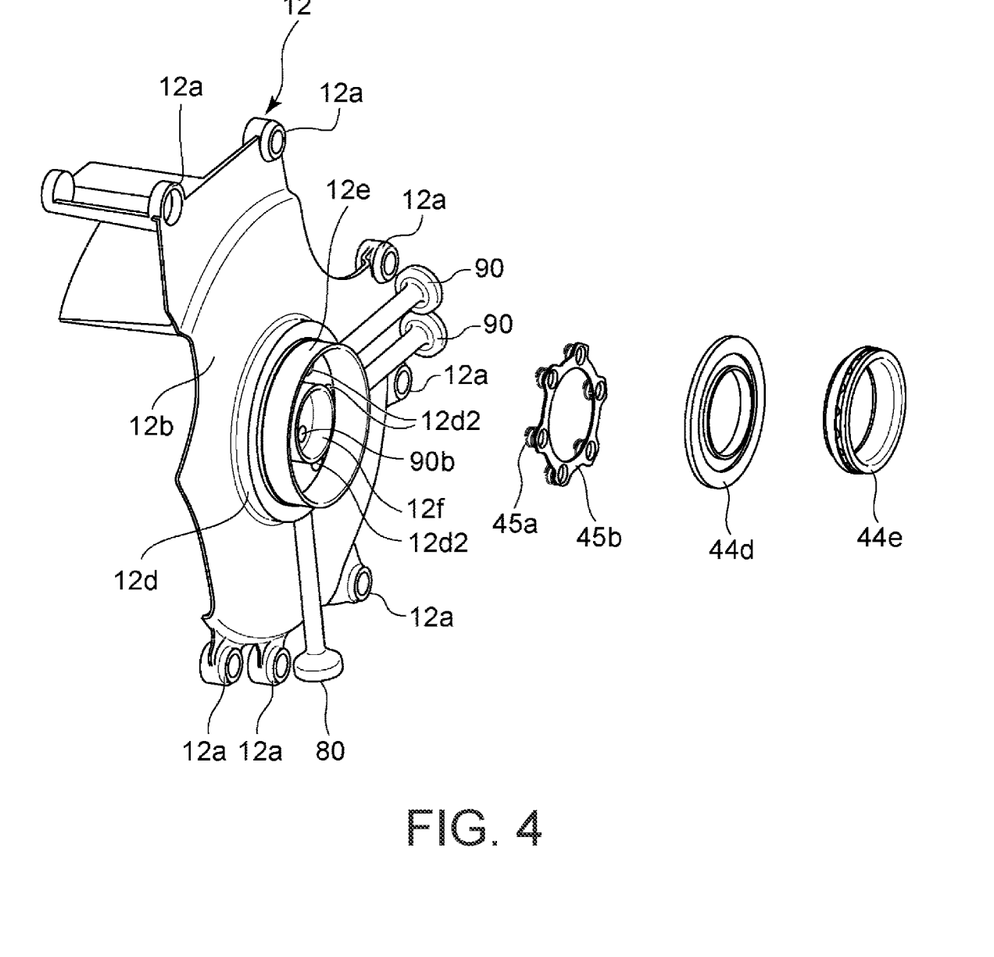
FIG. 4 is an exploded perspective view of a part of the starting clutch.
Figure 5:
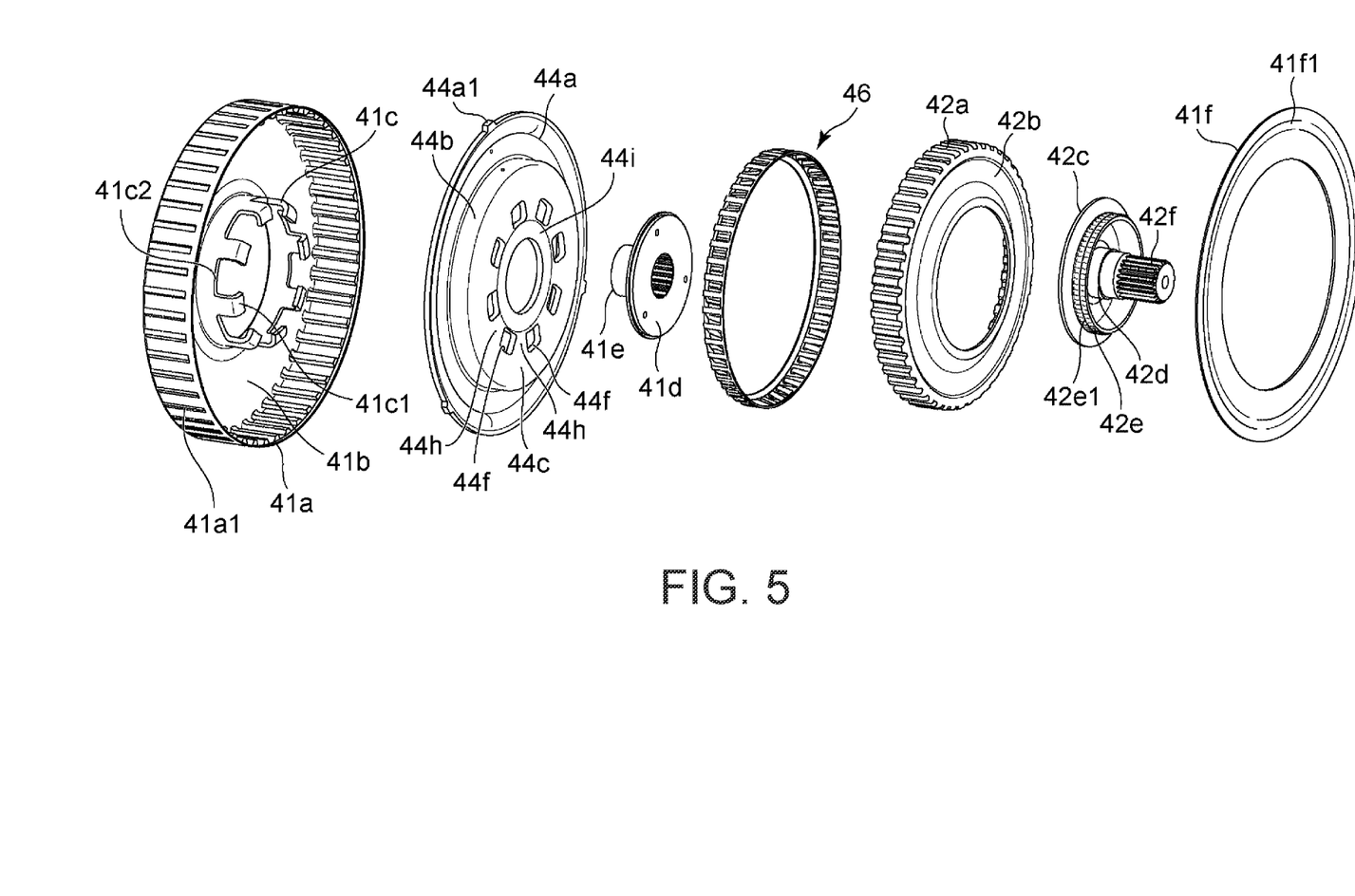
FIG. 5 is an exploded perspective view of the remaining part of the starting clutch.

Next, a configuration of the starting clutch 4 will be described with reference to FIGS. 2 to 5. It should be noted that FIGS. 4 and 5 are exploded perspective views of a clutch drum 41, a clutch hub 42, a piston 44, and the partition wall 12 which form the starting clutch 4.

Figure 2:
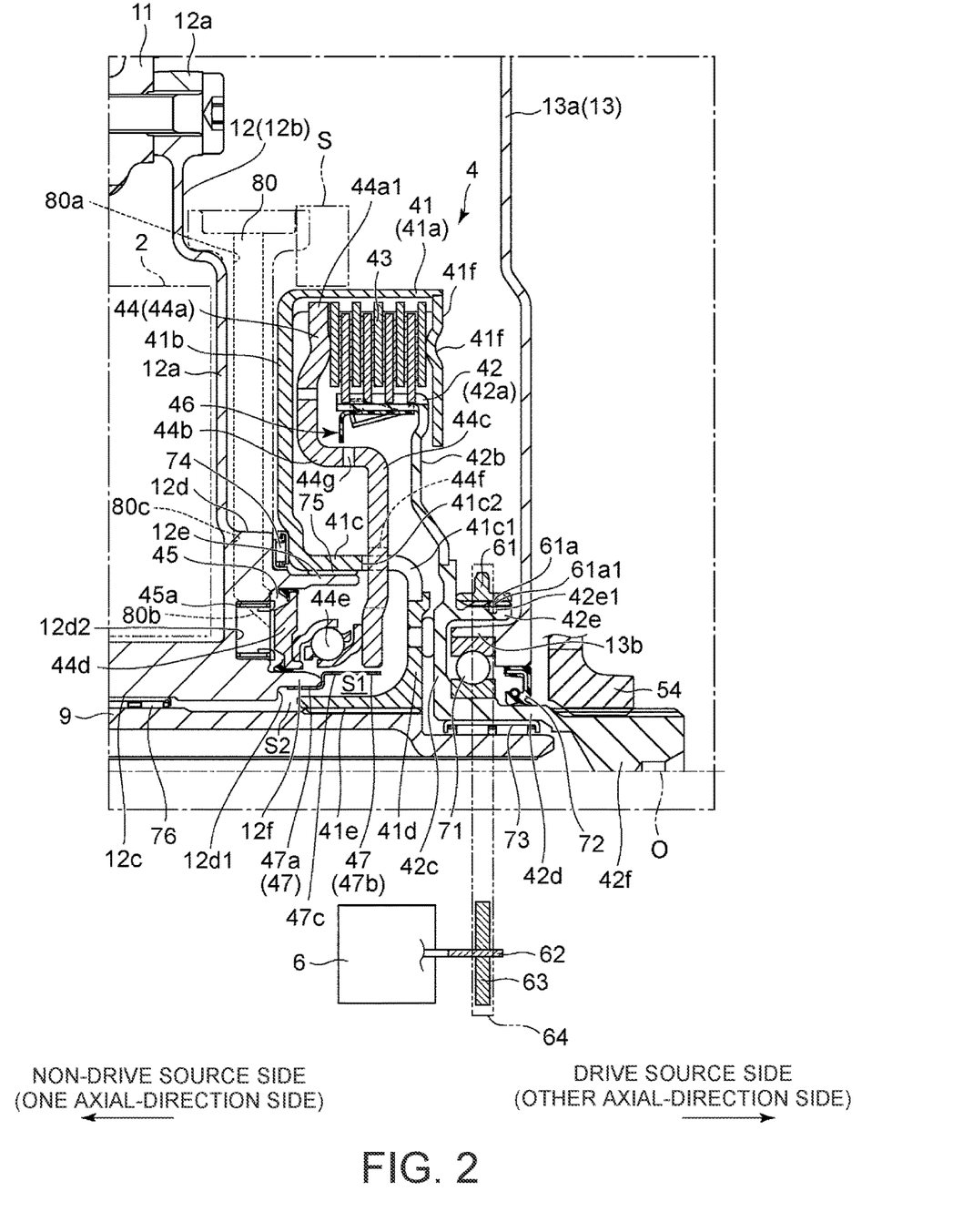
FIG. 2 is an enlarged cross-sectional view of the starting clutch of arrow II in FIG. 1.

As illustrated in FIG. 2, the starting clutch 4 has the clutch drum 41, the clutch hub 42, each of a plurality of friction plates 43 disposed side by side in the axial direction between the clutch drum 41 and the clutch hub 42 and alternately spline-engaged with the clutch drum 41 and the clutch hub 42, the piston 44 disposed on the non-drive source side (a first axial-direction side) of the friction plates 43, and a hydraulic chamber 45 provided on the non-drive source side of the piston 44. When fastening pressure is supplied to the hydraulic chamber 45, the piston 44 of the starting clutch 4 presses the friction plates 43 to couple the clutch drum 41 and the clutch hub 42 together, thereby fastening the starting clutch 4.

The clutch drum 41 is formed by, for example, pressing a plate member made of a magnetic body of iron material or the like. The clutch drum 41 includes an outer-side cylindrical portion 41a with which the friction plates 43 are engaged, a disc-shaped first radial-direction portion 41b extending from an end portion of the outer-side cylindrical portion 41a on the first axial-direction side to the radial-direction inner side, a first axial-direction portion 41c extending from an inner end portion of the first radial-direction portion 41b on the radial-direction inner side to the second axial-direction side and serving as a comb-teeth shaped axial-direction portion, a disc-shaped second radial-direction portion 41d extending from an end portion of the first axial-direction portion 41c on the second axial-direction side to the radial-direction inner side, and a second axial-direction portion 41e extending from an inner end portion of the second radial-direction portion 41d on the radial-direction inner side to the first axial-direction side and serving as a second axial-direction portion different from the first axial-direction portion 41c.

A ring-shaped oil dam member 41f extending from an end portion of the outer-side cylindrical portion 41a on the first axial-direction side (drive source side) to the radial-direction inner side is disposed at the outer-side cylindrical portion 41a of the clutch drum 41. The oil dam member 41f is located on the second axial-direction side of the friction plates 43, and is fixed to the outer-side cylindrical portion 41a by an end portion of the oil dam member 41f on the radial-direction outer side being welded to the outer-side cylindrical portion 41a. The oil dam member 41f has a function of causing the friction plates 43 to be immersed in oil supplied from the radial-direction inner side toward the outer side, for the lubrication of the starting clutch 4, and has a role as a restricting member which restricts movement of the friction plates 43 in the axial direction at the time of fastening.

An outer peripheral surface of the outer-side cylindrical portion 41a is provided with irregularities 41a1 of a spline portion formed on an inner peripheral surface by pressing. A rotational speed sensor S for detecting a rotational speed of the clutch drum 41 is disposed on the outer peripheral side of the outer-side cylindrical portion 41a. The rotational speed sensor S outputs a detection signal based on a rotation rate of the clutch drum 41, and for example, a magnetic sensor can be used as the rotational speed sensor S.

For example, the rotational speed sensor S is fixed to an unillustrated control valve or the like so as to face an outer peripheral surface of the clutch drum 41, and is configured to detect the irregularities formed on the outer peripheral surface of the clutch drum 41 to thereby output the detection signal based on the rotation rate of the clutch drum 41. Gear-shifting control of the automatic transmission 1 is performed based on this detection signal.

The first radial-direction portion 41b extends along the partition wall 12 so as to be generally orthogonal to the axial direction. The first axial-direction portion 41c is formed in a comb-teeth shape and penetrates through, in the axial direction, through holes 44f equally disposed side by side in the circumferential direction and provided in the piston 44, which will be described later (see FIG. 5). A spline portion is formed on the radial-direction inner side of the second axial-direction portion 41e and spline-fitted to the input shaft 9.

In the present embodiment, in the clutch drum 41, the outer-side cylindrical portion 41a, the first radial-direction portion 41b, and the first axial-direction portion 41c are formed separately from the second radial-direction portion 41d and the second axial-direction portion 41e. In other words, the clutch drum 41 is formed by an outer-peripheral side clutch drum including the outer-side cylindrical portion 41a, the first radial-direction portion 41b, and the first axial-direction portion 41c, and an inner-peripheral side clutch drum including the second radial-direction portion

41*d* and the second axial-direction portion 41*e*. In the clutch drum 41, in a state where the first axial-direction portion 41*c* penetrates through, in the axial direction, the through holes 44*f* provided in the piston 44, which will be described later, a flange portion 41*c*1 extending from another end portion in the axial direction provided in the first axial-direction portion 41*c* to the radial-direction inner side and an end portion of the second radial-direction portion 41*d* on the radial-direction outer side are joined together by welding and integrated.

The end portion of the first axial-direction portion 41*c* formed in the comb-teeth shape is closed by the disc-shaped second radial-direction portion 41*d*, thereby enhancing rigidity of the clutch drum 41 as compared with a case where the end portion of the first axial-direction portion 41*c* remains in the comb-teeth shape and coupling to the input shaft 9 is made. It should be noted that the manufacturing method of the clutch drum 41 and the piston 44 is not limited to the above-described welding, and the clutch drum 41 and the piston 44 may be, for example, an additively manufactured article formed by an additive manufacturing method. In this case, the clutch drum 41 and the piston 44 are formed integrally.

The clutch hub 42 includes an inner-side cylindrical portion 42*a* with which the friction plates 43 are engaged, a disc-shaped first radial-direction portion 42*b* extending from an end portion of the inner-side cylindrical portion 42*a* on the second axial-direction side to the radial-direction inner side, a second radial-direction portion 42*c* extending further from an inner end portion of the first radial-direction portion 42*b* to the radial-direction inner side, a cylindrical portion 42*d* extending from an end portion of the second radial-direction portion 42*c* on the radial-direction inner side to the second axial-direction side, and a shaft portion extending further from an end portion of the cylindrical portion 42*d* on the second axial-direction side in the axial direction. The output plate 54 of the flywheel damper 5 is spline-fitted to an outer periphery of the shaft portion. The shaft portion is embodied by the engine-side input shaft 42*f* which inputs rotation of the engine to the starting clutch 4.

The clutch hub 42 is provided with a cylinder portion 42*e* extending from a section on the radial-direction outer side of the second radial-direction portion 42*c* to the second axial-direction side. An outer peripheral surface of the cylinder portion 42*e* is provided with a spline portion, and a drive-side sprocket 61 for drive an oil pump 6 is fitted thereto. The spline portion of the cylinder portion 42*e* and a spline portion of the drive-side sprocket 61 are provided with respective engagement portions 42*e*1 and 61*a* for engaging a snap ring 61*a*1 for restricting movement of the drive-side sprocket 61 in the axial direction.

The oil pump 6 is formed by, for example, a vane pump, and a drive shaft 62 of a rotor including a vane is provided with a driven-side sprocket 63. When the clutch hub 42 rotates in association with rotation of the engine, the drive-side sprocket 61 rotates. The rotation of the drive-side sprocket 61 is transmitted to the driven-side sprocket 63 via a chain 64 wound around the drive-side sprocket 61 and the driven-side sprocket 63 to drive the oil pump 6.

The clutch hub 42 is rotatably supported on the damper housing 13 via a bearing 71 disposed between an outer peripheral surface of the cylindrical portion 42*d* and a boss portion 13*b* provided at an end portion of a raised wall portion 13*a* of the damper housing 13 on the radial-direction inner side. The boss portion 13*b* is located on the radial-direction inner side of the cylinder portion 42*e*, and an axial-direction position of the boss portion 13*b* overlaps with that of the cylinder portion 42*e*. A seal member 72 is disposed between a section on the drive-source side (the second axial-direction side) of the boss portion 13*b* and the outer peripheral surface of the cylindrical portion 42*d* so as to separate the damper chamber C and the starting clutch chamber B in an oil tight state. An inner peripheral surface of the cylindrical portion 42*d* and the input shaft 9 are made relatively rotatable by a needle bearing 73 disposed between the two. An annular baffle member 46 formed of resin or the like is press-fitted to an inner peripheral surface of the inner-side cylindrical portion 42*a*.

The piston 44 has a disc-shaped pressing portion 44*a* disposed between the clutch drum 41 and the friction plates 43 to press the friction plates 43 at the time of fastening, a cylindrical portion 44*b* extending from an inner end portion of the pressing portion 44*a* to the first axial-direction side, a disc-shaped radial-direction portion (piston radial-direction portion) 44*c* extending from an end portion of the cylindrical portion 44*b* on the second axial-direction side to the radial-direction inner side from the pressing portion 44*a*, a disc-shaped pressure receiving portion 44*d* including a pressure receiving surface which receives hydraulic pressure supplied to the hydraulic chamber 45, and a bearing portion 44*e* disposed between the radial-direction portion 44*c* and the pressure receiving portion 44*d*.

The pressing portion 44*a* extends toward the radial-direction inner side from the inner-side cylindrical portion 42*a* of the clutch hub 42. Projections 44*a*1 protruding in the radial direction are disposed side by side in the circumferential direction on the radial-direction outer side of the pressing portion 44*a*. The projections 44*a*1 are engaged with the spline portion of the outer-side cylindrical portion 41*a* of the clutch drum 41, thereby achieving rotation prevention of the piston 44.

The cylindrical portion 44*b* is located on the radial-direction outer side of the first axial-direction portion 41*c* of the clutch drum 41 and on the radial-direction inner side of the inner-side cylindrical portion 42*a* of the clutch hub 42 and is disposed so as to overlap with the inner-side cylindrical portion 42*a* and the first axial-direction portion 41*c* in the axial direction. The cylindrical portion 44*b* is provided with a through hole 44*g* penetrating through the cylindrical portion 44*b* in the radial direction. The through hole 44*g* is provided at a position corresponding to a flange portion of the baffle member 46, which will be described later.

The radial-direction intermediate portion of the radial-direction portion 44*c* intersects with the first axial-direction portion 41*c* of the clutch drum 41 in a comb-teeth shape, and the radial-direction portion 44*c* extends to a position on the radial-direction outer side of the second axial-direction portion 41*e*. The radial-direction portion 44*c* is provided with the through hole 44*f* penetrating therethrough in the axial direction. As illustrated in FIG. 5, the plurality of the through holes 44*f* are provided side by side in the circumferential direction corresponding to the comb-teeth shaped first axial-direction portion 41*c*. Each of the through holes 44*f* is formed such that the first axial-direction portion 41*c* can penetrate therethrough.

In the radial-direction portion 44*c*, the through holes 44*f* provided side by side in the circumferential direction form a comb-teeth portion 44*h* formed of the remaining part alternating with the through holes 44*f* in the circumferential direction at the intermediate portion in the radial direction. At inner end portions of the through holes 44*f* and the comb-teeth portion 44*h* in the radial direction, a bearing connecting portion 44*i* is integrally formed which extends from the inner end portions to the radial-direction inner side, which is formed in a disc shape, and to which the bearing portion 44e is connected. By the bearing connecting portion 44i, the inner end portions of the through holes 44f and the comb-teeth portion 44h are formed in a disc shape continuous in the circumferential direction.

The bearing portion 44e is disposed on the first axial-direction side of the radial-direction portion 44c. More specifically, an inner race of the bearing portion 44e is connected to the bearing connecting portion 44i on the radial-direction inner side from the through holes 44f of the radial-direction portion 44c by welding or the like. An outer race of the bearing portion 44e is connected to a surface of the pressure receiving portion 44d on the second axial-direction side by welding or the like. In other words, the bearing portion 44e is disposed between a part on the radial-direction inner side from the radial-direction intermediate portion of the radial-direction portion 44c and the pressure receiving portion 44d. The pressure receiving portion 44d and the bearing portion 44e are disposed within first and second cylinder portions 12e and 12f of the partition wall 12, which will be described later. The pressure receiving portion 44d and the bearing portion 44e are located on the radial-direction inner side from the first axial-direction portion 41c and disposed so as to overlap with the first axial-direction portion 41c in the axial direction. Furthermore, the bearing portion 44e is located on the radial-direction inner side from the cylindrical portion 44b of the piston 44 and overlaps with the pressing portion 44a and the cylindrical portion 44b in the axial direction.

The bearing portion 44e is disposed on the radial-direction inner side of the first axial-direction portion 41c of the clutch drum 41 so as to overlap with the first axial-direction portion 41c in the axial direction. In other words, the bearing portion 44e is disposed on the radial-direction inner side of the outer-peripheral side clutch drum including the first axial-direction portion 41c so as to overlap with the outer-peripheral side clutch drum in the axial direction. The bearing portion 44e is disposed between the first axial-direction portion 41c and the second axial-direction portion 41e in the radial direction so as to overlap with the first axial-direction portion 41c and the second axial-direction portion 41e in the axial direction.

The hydraulic chamber 45 is formed by the partition wall 12 and the pressure receiving portion 44d of the piston 44, and configurations of the partition wall 12 and the hydraulic chamber 45 will be described.

The partition wall 12 includes a fixed portion 12a which is fixed to an end portion of the case body 11 on the radial-direction outer side, a raised wall portion 12b extending from the fixed portion 12a to the radial-direction inner side, and a boss portion 12c extending toward the non-drive source side (first axial-direction side) at a radial-direction inner end portion of the raised wall portion 12b. The input shaft 9 is made relatively rotatable with respect to the partition wall 12 by a needle bearing 76 disposed between an inner peripheral surface of the boss portion 12c and the input shaft 9.

A section on the radial-direction inner side of the raised wall portion 12b is provided with a protrusion 12d protruding to the drive source side (the second axial-direction side). The protrusion 12d is located on the non-drive source side from the first radial-direction portion 41b of the clutch drum 41, and a bearing 74 is disposed between a surface of the protrusion 12d on the non-drive source side and the first radial-direction portion 41b so that the protrusion 12d and the first radial-direction portion 41b are relatively rotatable.

The tubular first cylinder portion 12e extending in the axial direction and the cylindrical second cylinder portion 12f located on the radial-direction inner side from the first cylinder portion 12e are provided on the radial-direction inner side from the bearing 74 on a surface of the protrusion 12d on the drive source side. The first axial-direction portion 41c of the clutch drum 41 is fitted to an outer peripheral surface of the first cylinder portion 12e via a bush 75.

The first cylinder portion 12e extends to an axial-direction position of a cutout portion 41c2 cut out in the comb-teeth shape of the first axial-direction portion 41c.

The second cylinder portion 12f is located on the radial-direction outer side from the second axial-direction portion 41e of the clutch drum 41 and overlaps with the second axial-direction portion 41e in the axial direction. A ring-shaped guide member 47 is press-fitted to an inner peripheral surface of the second cylinder portion 12f. The guide member 47 extends from the inner peripheral surface of the second cylinder portion 12f to a position on the radial-direction inner side of the radial-direction portion 44c of the piston. The guide member 47 has a fitting portion 47a which is fitted to the inner peripheral surface of the second cylinder portion 12f, and an extended portion 47b extending further from an end portion of the fitting portion 47a on the drive source side in the axial direction and having a larger diameter than the fitting portion 47a. The extended portion 47b is provided with a through hole 47c penetrating therethrough in the radial direction at a position corresponding to the bearing portion 44e.

A first passage S1 extending in the axial direction and open to a region on the non-drive source side of the radial-direction portion 44c of the piston is provided between an inner peripheral surface of the guide member 47 (the fitting portion 47a and the extended portion 47b) and an outer peripheral surface of the second axial-direction portion 41e. A second passage S2 allowing communication between a space between an outer peripheral surface of the input shaft 9 and an inner peripheral surface of the partition wall 12 and the first passage S1 is provided between a corner portion 12d1 formed by the inner peripheral surface of the second cylinder portion 12f and the surface of the protrusion 12d on the drive source side and an end portion of the second axial-direction portion 41e on the non-drive source side.

A plurality of recesses 12d2 open to the drive source side are equally provided in the circumferential direction on the surface of the protrusion 12d on the drive source side and between the first cylinder portion 12e and the second cylinder portion 12f. A spring 45a, which will be described later, is disposed in the recess 12d2 (see FIG. 4). The pressure receiving portion 44d is fitted between an inner peripheral surface of the first cylinder portion 12e and an outer peripheral surface of the second cylinder portion 12f.

The hydraulic chamber 45 is formed by the inner peripheral surface of the first cylinder portion 12e, the outer peripheral surface of the second cylinder portion 12f, a surface of the raised wall portion 12b on the drive source side (the second axial-direction side), and a surface of the pressure receiving portion 44d on the non-drive source side, in an oil tight state. The hydraulic chamber 45 is provided on the radial-direction inner side from the first axial-direction portion 41c and on the non-friction-plate 43 side of the radial-direction portion 44c of the piston 44. It should be noted that the raised wall portion 12b communicates with an upper end portion of the hydraulic chamber 45 and is provided with an air releasing portion for releasing air accumulated in the hydraulic chamber 45.

As described above, the automatic transmission 1 is connected to the engine without a torque converter, and thus the starting clutch 4 is configured to be subjected to slip control at the time of starting of the vehicle at a first speed and a reverse speed. Specifically, the spring 45*a* which biases, in the fastening direction, the piston 44 from a released position to a zero clearance position at which the friction plates 43 are in a zero clearance state, and a ring-shaped seat member 45*b* on which the spring 45*a* is seated are disposed within the hydraulic chamber 45 of the starting clutch 4 (see FIG. 3).

Thus, the starting clutch 4 which is subjected to the slip control at the time of starting of the vehicle biases, with the spring 45*a*, the piston 44 from the released position to the zero clearance position at which the friction plates 43 are in the zero clearance state, and biases the piston 44 from the zero clearance position to a fastened position with fastening hydraulic pressure to fasten the friction plates 43.

As illustrated in FIG. 2, a fastening operating oil supply passage 80 which supplies fastening operating oil is connected to the hydraulic chamber 45. The fastening operating oil supply passage 80 has a fastening radial-direction oil passage 80*a* provided on the raised wall portion 12*a* of the partition wall 12 and led from an unillustrated control valve unit to extend in the radial direction, an inclined oil passage 80*b* provided within the protrusion 12*d* and communicating with the hydraulic chamber 45, and a fastening communicating passage 80*c* provided within the protrusion 12*d* and allowing communication between the fastening radial-direction oil passage 80*a* and the inclined oil passage 80*b*.

The fastening radial-direction oil passage 80*a* is orthogonal to the axial direction, extends in the radial direction along the raised wall portion 12*b* of the partition wall 12, and is connected to an outer peripheral surface of the protrusion 12*d*. The fastening communicating passage 80*c* is provided at a position corresponding to the fastening radial-direction oil passage 80*a* in the circumferential direction and extends from the outer peripheral surface of the protrusion 12*d* toward the radial-direction inner side. The inclined oil passage 80*b* is provided so as to be inclined to the radial-direction outer side from the hydraulic chamber 45 toward the non-drive source side and communicates with the fastening communicating passage 80*c*. In this way, the fastening operating oil supply passage 80 leading from the fastening radial-direction oil passage 80*a* to the hydraulic chamber 45 of the starting clutch 4 via the fastening communicating passage 80*c* and the inclined oil passage 80*b* is formed.

As illustrated in FIG. 3, the partition wall 12 is provided with a lubricating oil supply passage 90 which supplies lubricating oil for lubricating the starting clutch 4. The lubricating oil supply passage 90 has a lubricating radial-direction oil passage 90*a* provided on the raised wall portion 12*a* of the partition wall 12 and led from the unillustrated control valve unit to extend in the radial direction, and a lubricating communicating passage 90*b* provided within the protrusion 12*d* and extending in the radial direction.

The lubricating radial-direction oil passage 90*a* is orthogonal to the axial direction, extends in the radial direction along the raised wall portion 12*b* of the partition wall 12, and is connected to the outer peripheral surface of the protrusion 12*d*. The lubricating radial-direction oil passage 90*a* is provided at a different position from the fastening radial-direction oil passage 80*a* in the circumferential direction (see FIG. 4). The lubricating communicating passage 90*b* is provided at a position corresponding to the lubricating radial-direction oil passage 90*a* in the circumferential direction, extends from the outer peripheral surface of the protrusion 12*d* toward the radial-direction inner side, and is open to the inner peripheral surface of the partition wall 12. In this way, the lubricating oil supply passage 90 is formed by the lubricating radial-direction oil passage 90*a* and the lubricating communicating passage 90*b*.

As indicated by arrows in FIG. 3, lubricating oil supplied to the inner peripheral surface side of the partition wall 12 via the lubricating oil supply passage 90 is supplied from the radial-direction inner side of the automatic transmission 1 toward the outer side. More specifically, lubricating oil supplied from a valve body to between the inner peripheral surface of the partition wall 12 and the outer peripheral surface of the input shaft 9 via the lubricating radial-direction oil passage 90*a* and the lubricating communicating passage 90*b* is supplied from the second passage S2 and the first passage S1 to a space between the radial-direction portion 44*c* of the piston 44 and the second radial-direction portion 41*d* of the clutch drum 41.

The lubricating oil supplied to the space between the radial-direction portion 44*c* and the second radial-direction portion 41*d* passes through the cutout portion 41*c*2 of the clutch drum 41, is supplied to the inner peripheral surface side of the inner-side cylindrical portion 42*a* of the clutch hub 42 located on the radial-direction outer side of the cutout portion 41*c*2, and is supplied from an end portion of the inner-side cylindrical portion 42*a* on the non-drive source side to between the friction plates 43. As a result, the lubricating oil supplied to between the friction plates 43 lubricates the friction plates 43 and is supplied to the outer-side cylindrical portion 41*a* side of the clutch drum 41.

In this way, the lubricating oil supplied from the valve body is configured to be supplied from the input shaft 9 side toward the outer-side cylindrical portion 41*a* side of the clutch drum 41.

As above, according to the automatic transmission 1 in the present embodiment, regarding the clutch drum 41 and the piston 44, the first axial-direction portion 41*c* and the radial-direction intermediate portion of the radial-direction portion 44*c* intersect with each other in the comb-teeth shape, so that the hydraulic chamber 45 can be provided on the outer side of a space in which the friction plates 43 surrounded by the outer-side cylindrical portion 41*a*, the first radial-direction portion 41*b*, and the first axial-direction portion 41*c* are housed and on the radial-direction inner side from the first axial-direction portion 41*c*. As a result, the axial-direction dimensions of the clutch drum 41 can be shortened as compared with a case where the hydraulic chamber is provided on the inner side of the space in which the friction plates 43 are housed.

In the clutch drum 41 and the piston 44, a part except for the first axial-direction portion 41*c* and the radial-direction intermediate portion of the radial-direction portion 44*c* which intersect with each other in the comb-teeth shape is formed in a disc shape continuous in the circumferential direction, so that, even in the case where the clutch drum 41 and the piston 44 intersect with each other in the comb-teeth shape, deterioration of the rigidity of the clutch drum 41 and the piston 44 can be suppressed.

The clutch drum 41 is formed by two components which are the outer-peripheral side clutch drum including the outer-side cylindrical portion 41*a*, the first radial-direction portion 41*b*, and the first axial-direction portion 41*c*, and the inner-peripheral side clutch drum including the second radial-direction portion 41*d* and the second axial-direction portion 41*e*. Accordingly, while the first axial-direction portion 41*c* of the clutch drum 41 and the radial-direction portion 44c of the piston 44 intersect with each other, the comb-teeth shaped flange portion 41c1 of the first axial-direction portion 41c can be closed in a ring shape, so that deterioration of the rigidity of the clutch drum 41 and the piston 44 can be suppressed.

A part to which the bearing portion 44e in the radial-direction portion 44c of the piston 44 is connected is formed in a ring shape, so that the rigidity of the piston 44 is easily enhanced as compared with a case where, for example, the radial-direction portion 44c of the piston 44 is formed in a comb-teeth shape and connected to the bearing portion 44e.

The bearing portion 44e is disposed on the radial-direction inner side from the pressing portion 44a of the piston 44 so as to overlap with the pressing portion 44a in the axial direction, so that the axial-direction dimensions can be shortened as compared with a case where the bearing portion 44e and the pressing portion 44a are disposed side by side in the axial direction.

The bearing portion 44e is disposed on the radial-direction inner side of the outer-peripheral side clutch drum so as to overlap with the outer-peripheral side clutch drum in the axial direction, so that the axial-direction dimensions can be shortened as compared with a case where the bearing portion 44e and the outer-side clutch drum are disposed side by side in the axial direction.

The bearing portion 44e is disposed between the first axial-direction portion 41c and the second axial-direction portion 41e so as to overlap with the first axial-direction portion 41c and the second axial-direction portion 41e in the axial direction, so that the axial-direction dimensions can be shortened as compared with a case where the second axial-direction portion 41e and the bearing portion 44e are disposed side by side in the axial direction.

Although the present disclosure has been described above with reference to the above-described embodiment, the present disclosure is not limited to the above-described embodiment. Various modifications and changes can also be made without departing from the gist and scope of the present disclosure.

Although in the present embodiment, the clutch device has been described using the starting clutch 4 disposed between the engine and the transmission mechanism to connect and disconnect motive power between the engine and the transmission mechanism, this is not restrictive and the present disclosure may be applied to a clutch forming the transmission mechanism 2.

INDUSTRIAL APPLICABILITY

As above, according to the present disclosure, in an automatic transmission including a clutch device, it is possible to suppress deterioration of rigidity of a clutch drum and a piston while shortening axial-direction dimensions of the clutch device; accordingly, it may be preferably used in an industrial field of manufacturing automatic transmissions including an automatic transmission of this type.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

REFERENCE CHARACTER LIST 1 automatic transmission
4 starting clutch (clutch device)
41 clutch drum
41a outer-side cylindrical portion
42 clutch hub
42a inner-side cylindrical portion
41b first radial-direction portion
41c first axial-direction portion (axial-direction portion)
41d second radial-direction portion
41e second axial-direction portion
43 friction plate
44 piston
44a pressing portion
44c radial-direction portion (piston radial-direction portion)
44d pressure receiving portion
44e bearing portion
44h comb-teeth portion
45 hydraulic chamber

The invention claimed is:

1. An automatic transmission comprising a clutch device, wherein
the clutch device comprises:
a clutch hub comprising an inner-side cylindrical portion located on a radial-direction inner side;
a clutch drum comprising an outer-side cylindrical portion disposed on a radial-direction outer side of the inner-side cylindrical portion;
a friction plate provided slidably between the inner-side cylindrical portion and the outer-side cylindrical portion;
a piston which presses the friction plate from a first axial-direction side; and
a hydraulic chamber to which operating oil which urges the piston in a direction of the friction plate is supplied,
the clutch drum comprises:
a disc-shaped first radial-direction portion extending from an end portion of the outer-side cylindrical portion on the first axial-direction side toward the radial-direction inner side;
a comb-teeth shaped axial-direction portion extending from an end portion of the first radial-direction portion on the radial-direction inner side toward a second axial-direction side; and
a disc-shaped second radial-direction portion extending from an end portion of the axial-direction portion on the second axial-direction side toward the radial-direction inner side,
the piston comprises:
a pressing portion disposed between the first radial-direction portion and the friction plate to press the friction plate; and
a disc-shaped piston radial-direction portion extending toward the radial-direction inner side from the pressing portion,
the hydraulic chamber is provided on the radial-direction inner side from the axial-direction portion of the clutch drum and on a non-friction-plate side of the piston radial-direction portion, and
a comb-teeth portion is provided at a radial-direction intermediate portion of the piston radial-direction portion, and the axial-direction portion and the piston radial-direction portion intersect with each other in a comb-teeth shape.

2. The automatic transmission according to claim 1, wherein the clutch drum further comprises:

an outer-peripheral side clutch drum comprising the outer-side cylindrical portion, the first radial-direction portion, and the axial-direction portion; and an inner-peripheral side clutch drum comprising the second radial-direction portion and attached to an inner end portion of the outer-peripheral side clutch drum in a radial direction.

3. The automatic transmission according to claim 2, wherein the clutch drum and the piston are an additively manufactured article formed by an additive manufacturing method.

4. The automatic transmission according to claim 3, wherein the piston further comprises:
   a pressure receiving portion which receives pressure of the operating oil supplied to the hydraulic chamber; and
   a bearing portion disposed between a part on the radial-direction inner side from the radial-direction intermediate portion of the piston radial-direction portion and the pressure receiving portion.

5. The automatic transmission according to claim 4, wherein the bearing portion is disposed on the radial-direction inner side from the pressing portion of the piston so as to overlap with the pressing portion in an axial direction.

6. The automatic transmission according to claim 5, wherein the bearing portion is disposed on the radial-direction inner side of the axial-direction portion so as to overlap with the axial-direction portion in an axial direction.

7. The automatic transmission according to claim 6, wherein
   the axial-direction portion is a first axial-direction portion,
   the clutch drum comprises a second axial-direction portion extending from an end portion of the second radial-direction portion on the radial-direction inner side toward the first axial-direction side and overlapping with the first axial-direction portion in an axial direction, and
   the bearing portion is disposed between the first axial-direction portion and the second axial-direction portion so as to overlap with the first axial-direction portion and the second axial-direction portion in the axial direction.

8. The automatic transmission according to claim 2, wherein the piston further comprises:
   a pressure receiving portion which receives pressure of the operating oil supplied to the hydraulic chamber; and
   a bearing portion disposed between a part on the radial-direction inner side from the radial-direction intermediate portion of the piston radial-direction portion and the pressure receiving portion.

9. The automatic transmission according to claim 8, wherein the bearing portion is disposed on the radial-direction inner side from the pressing portion of the piston so as to overlap with the pressing portion in an axial direction.

10. The automatic transmission according to claim 8, wherein the bearing portion is disposed on the radial-direction inner side of the axial-direction portion so as to overlap with the axial-direction portion in an axial direction.

11. The automatic transmission according to claim 8, wherein
    the axial-direction portion is a first axial-direction portion,
    the clutch drum comprises a second axial-direction portion extending from an end portion of the second radial-direction portion on the radial-direction inner side toward the first axial-direction side and overlapping with the first axial-direction portion in an axial direction, and
    the bearing portion is disposed between the first axial-direction portion and the second axial-direction portion so as to overlap with the first axial-direction portion and the second axial-direction portion in the axial direction.

12. The automatic transmission according to claim 1, wherein the clutch drum and the piston are an additively manufactured article formed by an additive manufacturing method.

13. The automatic transmission according to claim 12, wherein the piston further comprises:
    a pressure receiving portion which receives pressure of the operating oil supplied to the hydraulic chamber; and
    a bearing portion disposed between a part on the radial-direction inner side from the radial-direction intermediate portion of the piston radial-direction portion and the pressure receiving portion.

14. The automatic transmission according to claim 13, wherein the bearing portion is disposed on the radial-direction inner side from the pressing portion of the piston so as to overlap with the pressing portion in an axial direction.

15. The automatic transmission according to claim 13, wherein the bearing portion is disposed on the radial-direction inner side of the axial-direction portion so as to overlap with the axial-direction portion in an axial direction.

16. The automatic transmission according to claim 13, wherein
    the axial-direction portion is a first axial-direction portion,
    the clutch drum comprises a second axial-direction portion extending from an end portion of the second radial-direction portion on the radial-direction inner side toward the first axial-direction side and overlapping with the first axial-direction portion in an axial direction, and
    the bearing portion is disposed between the first axial-direction portion and the second axial-direction portion so as to overlap with the first axial-direction portion and the second axial-direction portion in the axial direction.

17. The automatic transmission according to claim 1, wherein the piston further comprises:
    a pressure receiving portion which receives pressure of the operating oil supplied to the hydraulic chamber; and
    a bearing portion disposed between a part on the radial-direction inner side from the radial-direction intermediate portion of the piston radial-direction portion and the pressure receiving portion.

18. The automatic transmission according to claim 17, wherein the bearing portion is disposed on the radial-direction inner side from the pressing portion of the piston so as to overlap with the pressing portion in an axial direction.

19. The automatic transmission according to claim 17, wherein the bearing portion is disposed on the radial-direction inner side of the axial-direction portion so as to overlap with the axial-direction portion in an axial direction.

20. The automatic transmission according to claim 17, wherein
    the axial-direction portion is a first axial-direction portion,
    the clutch drum comprises a second axial-direction portion extending from an end portion of the second radial-direction portion on the radial-direction inner side toward the first axial-direction side and overlapping with the first axial-direction portion in an axial direction, and the bearing portion is disposed between the first axial-direction portion and the second axial-direction portion so as to overlap with the first axial-direction portion and the second axial-direction portion in the axial direction.

\* \* \* \* \*